US012500018B2

(12) United States Patent
Arasim

(10) Patent No.: US 12,500,018 B2
(45) Date of Patent: Dec. 16, 2025

(54) SOFT MAGNETIC CORE WITH BACKWALL AIR GAP

(71) Applicant: Fair-Rite Products, Corp., Wallkill, NY (US)

(72) Inventor: Michael Arasim, Middletown, NY (US)

(73) Assignee: Fair-Rite Products Corp., Wallkill, NY (US)

( * ) Notice: Subject to any disclaimer, the term of this patent is extended or adjusted under 35 U.S.C. 154(b) by 958 days.

(21) Appl. No.: 17/672,051

(22) Filed: Feb. 15, 2022

(65) Prior Publication Data

US 2022/0262553 A1 Aug. 18, 2022

Related U.S. Application Data

(60) Provisional application No. 63/149,536, filed on Feb. 15, 2021.

(51) Int. Cl.
*H01F 3/14* (2006.01)
*H01F 17/04* (2006.01)
*H01F 27/26* (2006.01)

(52) U.S. Cl.
CPC ............. *H01F 3/14* (2013.01); *H01F 17/043* (2013.01); *H01F 27/263* (2013.01)

(58) Field of Classification Search
CPC ............. H01F 3/14; H01F 17/043; H01F 3/08
See application file for complete search history.

(56) References Cited

U.S. PATENT DOCUMENTS 4,675,638 A * 6/1987 Szabo ...................... H01F 38/14 336/215
2005/0134417 A1* 6/2005 Maekawa ............... H01F 38/12 336/92
2012/0299679 A1* 11/2012 Kobayashi .............. H01F 38/12 336/212
2015/0070122 A1* 3/2015 Yang ......................... H01F 3/10 336/83
2015/0357111 A1* 12/2015 Sasaki ....................... H01F 5/04 29/605

(Continued)

FOREIGN PATENT DOCUMENTS

AU 2012349897 * 12/2012 ............... H01F 3/08
CN 1495813 A * 5/2004 ............ H01F 27/28

(Continued)

*Primary Examiner* — Shawki S Ismail
(74) *Attorney, Agent, or Firm* — Gerald E. Hespos; Michael J Porco

(57) ABSTRACT

A core assembly is made from a material having a magnetic permeability greater than 1. The core assembly includes a base and a lid positioned on the base. Spaced apart end walls project up from the base and a protrusion projects from the base at a position between the end walls. The protrusion projects farther up than the end walls. The lid is formed with an opening into which the protrusion is inserted when the lid is mounted on the base. Relative dimensions of the protrusion and the opening are selected so that a gap of specified dimensions exists between the opening and the protrusion. The specific dimension of the gap between the protrusion and the opening in the lid is selected to control the inductance factor $A_L$ of the core assembly.

8 Claims, 7 Drawing Sheets

(56) References Cited

U.S. PATENT DOCUMENTS

| | | | | |
|---|---|---|---|---|
| 2022/0262553 | A1 * | 8/2022 | Arasim | H01F 3/14 |

FOREIGN PATENT DOCUMENTS

| | | | | | |
|---|---|---|---|---|---|
| CN | 213629795 | U | * | 7/2021 | |
| DE | 102007058074 | A1 | * | 6/2009 | H01F 3/14 |
| DE | 102007058076 | A1 | * | 6/2009 | H01F 38/12 |
| DE | 102007058077 | A1 | * | 6/2009 | H01F 38/12 |
| EP | 2099040 | A2 | * | 9/2009 | H01F 27/255 |
| WO | WO-2008104636 | | * | 2/2008 | H01F 41/0246 |
| WO | WO-2008104636 | A1 | * | 9/2008 | H01F 41/0246 |

* cited by examiner

SOFT MAGNETIC CORE WITH BACKWALL AIR GAP

CROSS-REFERENCE TO RELATED APPLICATION

This application claims priority on U.S. Provisional Application No. 63/149,536, filed Feb. 15, 2021, the entire disclosure of which is incorporated herein by reference.

TECHNICAL FIELD

This disclosure relates generally to a soft magnetic core with an air gap to reduce or otherwise control inductance in an electrical apparatus.

BACKGROUND

A magnetic core is formed from a material with magnetic permeability greater than 1. Common materials for a magnetic core include, but are not limited to, powdered iron, steel and ferrite. A magnetic core often is constructed from multiple components formed from one of the aforementioned materials, and the components are mated together around one or more windings. The purpose of the core is to promote coupling between multiple windings or to add inductance in a single winding configuration or some combination of these purposes.

The magnetic components from which the core is made generally mate to each other via flat surfaces that are features of the individual components. In general, a goal of a magnetic core is to minimize the distance between these mated surfaces to ensure that the magnetic field is traveling through the material of the core rather than through some other medium, such as air. However, the desired magnetic properties of some components may require a gap to be induced deliberately between these mating surfaces.

There are various reasons for introducing a gap into a magnetic core structure. A primary reason is to control the air gap inductance factor ($A_L$) of the core. Solid or near solid magnetic cores may have an inductance factor ($A_L$) that is higher than the inductance factor ($A_L$) that is needed in the intended application. Additionally, the variability of the inductance factor ($A_L$) might need to be controlled more tightly than is possible through process control of the material properties from which the core is formed. Generally, introducing a larger air gap lowers the nominal inductance factor ($A_L$) value. Along with the lower $A_L$ value comes a tighter $A_L$ tolerance that can be imposed on the core. The opposite effect is true of smaller gap sizes.

One shortcoming of traditional gapping is that the $A_L$ tolerance gets wider for smaller gap sizes. This is due to the need to hold progressively tighter absolute tolerances as the overall gap shrinks to maintain the same $A_L$ tolerance. A second shortcoming is that gapping can cause power losses due to fringing interaction with the winding on the core. When a gap is present along a magnetic path, the flux is no longer contained well. This means that the flux can induce undesirable currents in any conductors that are in close proximity to the break in the magnetic material.

SUMMARY

This disclosure relates to a method of forming an air gap in a soft magnetic core and to a resulting magnetic core. The disclosure relates specifically to mated cores that have at least one mating surface set back from the faces of the core.

Examples of such mated cores include the IE standard geometry identified as EP, ER, EQ and RM as well as pot cores and other geometries that meet these broad guidelines.

The disclosure also relates to cores of the types referred to above that enable an increase in the height for a central mating surface so that the central mating surface is level with a back wall of the opposed mating core half. For example, a first core in the pair would have an aperture in which the mating surface of a second core in the pair would fit substantially concentrically. A size of a gap between these opposed surfaces can be controlled by appropriately dimensioning the size of the aperture in the first core relative to the size of the part of the second core fitting into that aperture. More particularly, the size of the gap can be controlled by appropriately dimensioning the size of the aperture relative to the size of the part of the mating core that is to be mated into the aperture. This adjustment can be made to either the aperture or the mating component that fits into the aperture.

Illustrative examples of cores that embody the invention are illustrated in the accompanying drawings and are described in the following detailed description.

DETAILED DESCRIPTION

Figure 1:
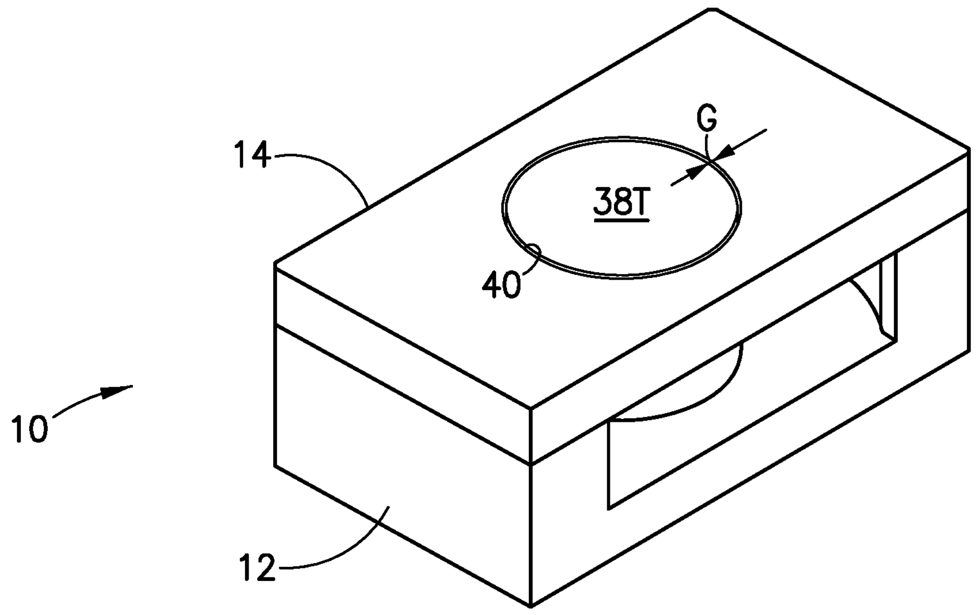
FIG. 1 is a perspective view of a core assembly comprised of a base and a lid in accordance with a first embodiment of the invention.
Figure 2:
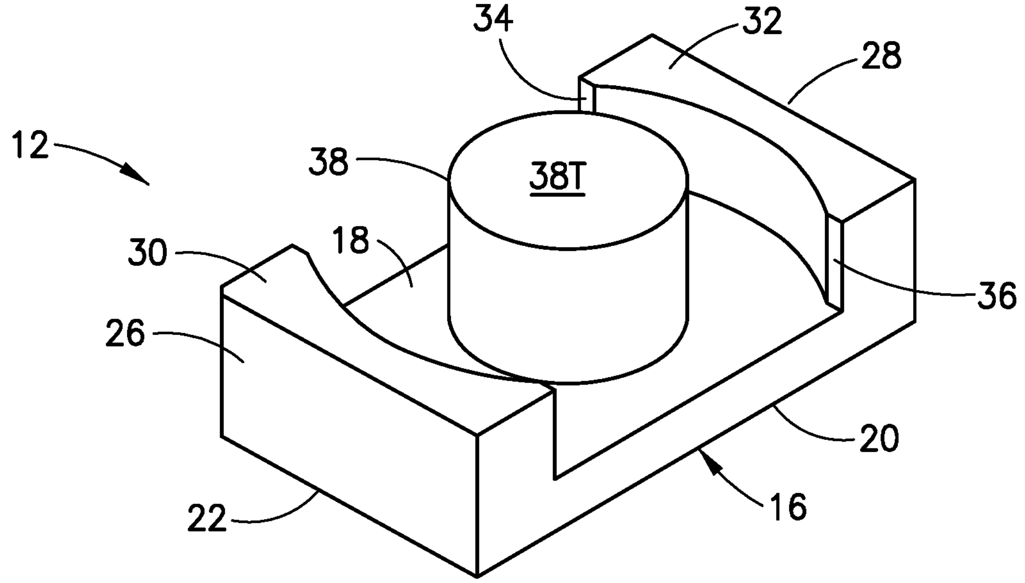
FIG. 2 is a perspective view of the base of the core assembly illustrated in FIG. 1.
Figure 3:
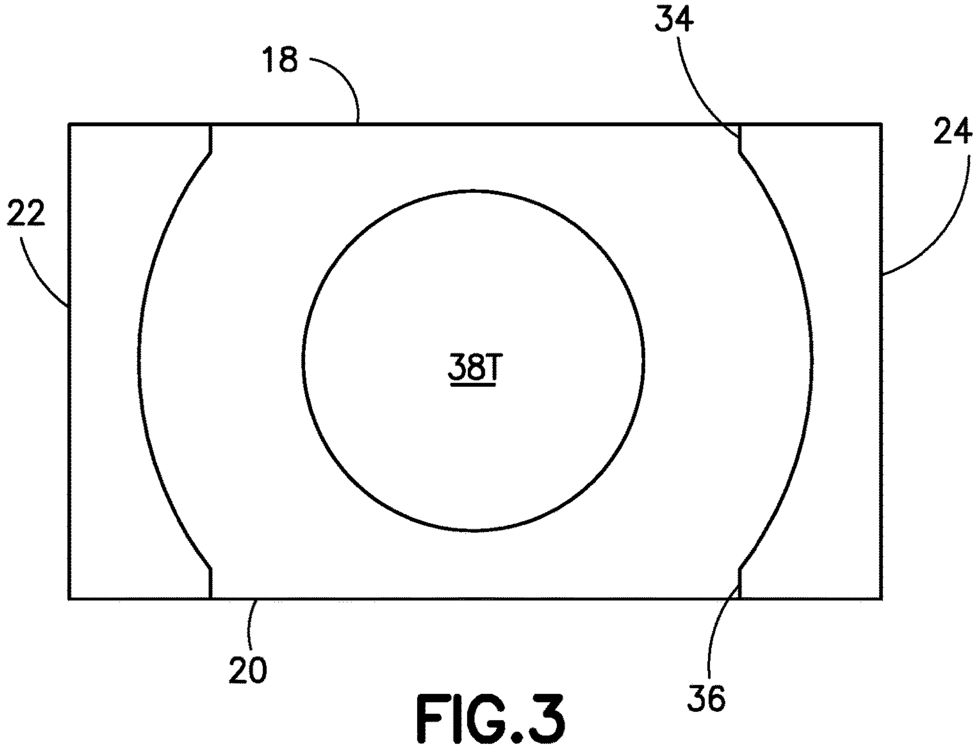
FIG. 3 is a side elevational view of the base illustrated in FIG. 2.
Figure 4:
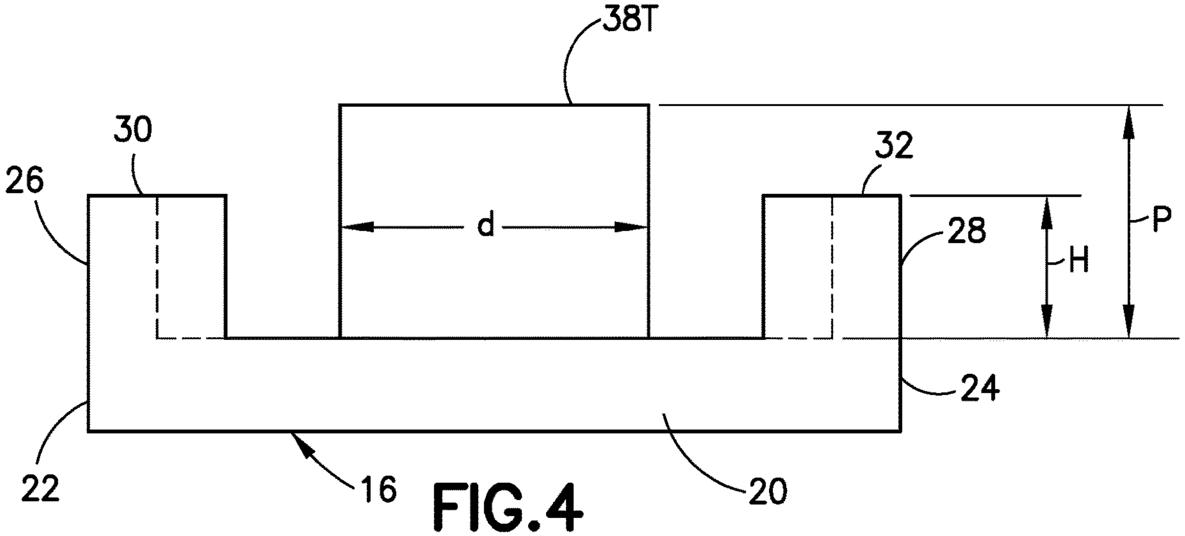
FIG. 4 is a top plan view of the base of the base illustrated in FIGS. 2 and 3.
Figure 6:
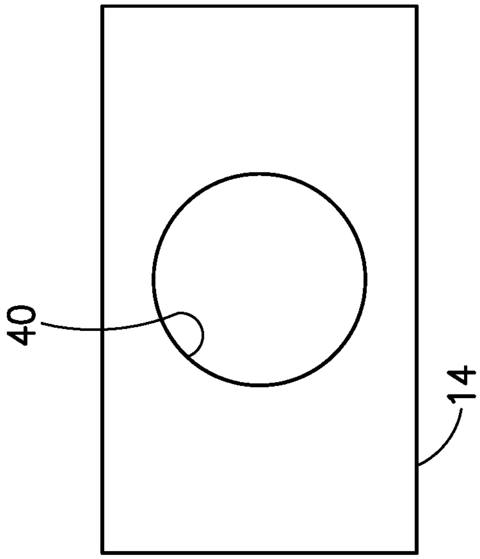
FIG. 6 is a top plan view of the lid illustrated in FIG. 5.

A core assembly in accordance with a first embodiment of the invention is identified generally by the numeral 10 in FIGS. 1-8. The core assembly 10 is comprised of a base 12 and a lid 14 both of which are formed from a material having a magnetic permeability greater than 1, such as powdered iron, steel or ferrite. The base 12 and the lid 14 may be formed into a specified shape, such as those described herein by pressing and sintering operations, possibly followed by grinding and/or machining to achieve a specified shape dictated by the end use of the core assembly.

The base 12 has a substantially rectangular bottom wall 16 with opposite sides 18 and 20 and opposite ends 22 and 24. The base 12 also has opposite end walls 26 and 28 projecting up respectively from opposite ends 22 and 24 of the bottom wall 16. The end walls 26 and 28 have top ends 30 and 32 that are substantially planar and lie in a common plane that is parallel to the bottom wall 16. The terms "bottom" and "top" as used herein are provided as a frame of reference and are not intended to identify or imply a required or preferred gravitational orientation of the core assembly 10. Surfaces of the end walls 26 and 28 that face one another are concave surfaces that define parts of a right cylinder. However, other configurations are possible as explained with respect to the second and third embodiments and with other embodiments that are not specifically illustrated herein. The opposite end walls 26 and 28 of the base 12 are separated from one another so that side openings 34 and 36 are defined at opposite sides of the base 12.

The base 12 further includes a cylindrical center protrusion 38 projecting up from the bottom wall 16 at a position between the end walls 26 and 28 so that the cylindrical center protrusion 38 is substantially concentric with the surfaces of the end walls 26 and 28 that face one another. The center protrusion 38 defines a projecting distance P from the bottom wall 16 that is greater than the height H of each end wall 26 and 28. More particularly, the center protrusion 38 has a top surface 38T that is planar and parallel to the top ends 30 and 32 of the end walls 26 and 28 but at a position above the top ends 30 and 32 of the end walls 26 and 28. Additionally, the center protrusion 38 has a diameter d.

The lid 14 is a substantially planar rectangular wall having length and width dimensions substantially equal to the length and the width of the base 12. The lid 14 further has a substantially circular opening 40 extending therethrough at a position equally spaced from the opposite ends and equally spaced from the opposite sides. The circular opening 40 has a diameter D that is a specified amount greater than the diameter d of the center protrusion 38 of the base 12 so that the center protrusion 38 can pass into and at least partly through the circular opening 40 while leaving a circumferential gap of a specified dimension G. The lid 14 has a thickness t that is selected relative to the heights H of the end walls 26 and 28 and the projecting amount P of the center protrusion 38 so that the top surface 38T is flush with or slightly recessed from the top surface of the lid 14 when the lid 14 is supported on the top ends 30 and 32 of the respective end walls 26 and 28 of the base 12. The illustrated embodiments depict the preferred arrangement where the top surface 38T is flush with the top surface of the lid 14 when the lid rests on the top ends 30 and 32 of the end walls 28 and 30.

Figure 8:
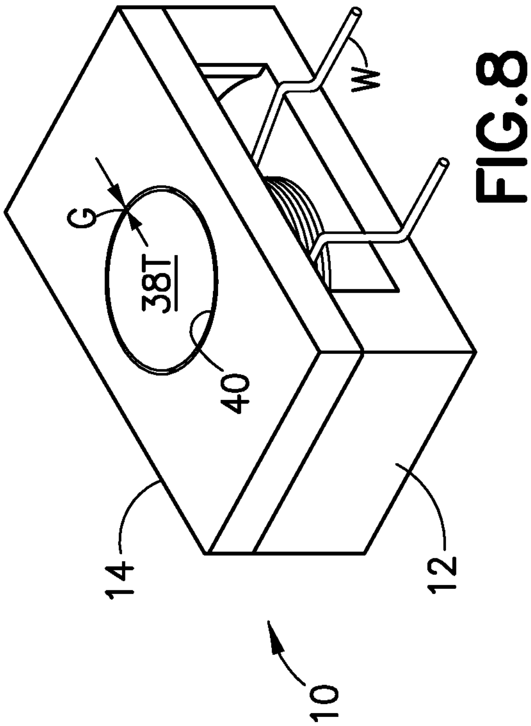
FIG. 8 is a perspective view of the core assembly of FIG. 1 with a conductive winding of a magnetic wire wound around the central protrusion of the base of the core assembly.
Figure 5:
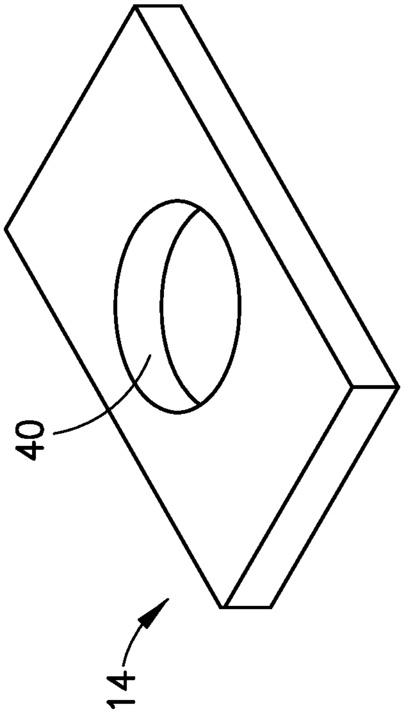
FIG. 5 is a perspective view of the lid of the core assembly illustrated in FIG. 1.
Figure 7:
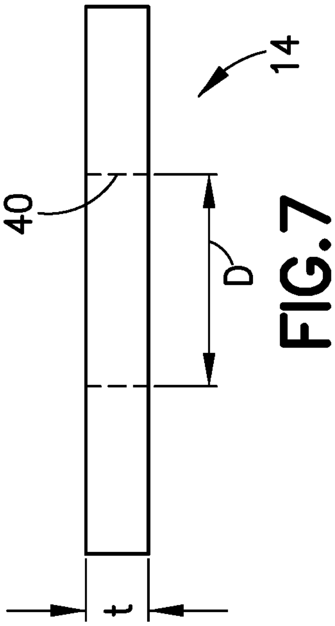
FIG. 7 is a side elevational view of the lid illustrated in FIGS. 5 and 6.
Figure 9:
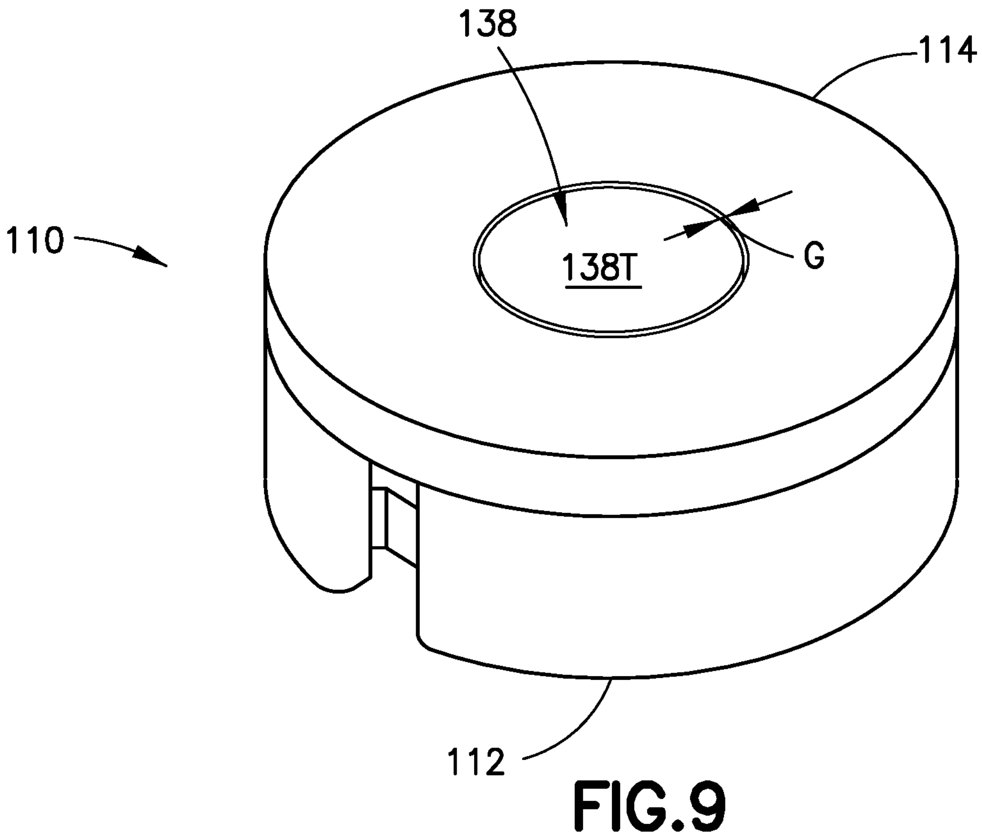
FIG. 9 is a perspective view of a core assembly comprised of a base and a lid in accordance with a second embodiment of the invention.
Figure 10:
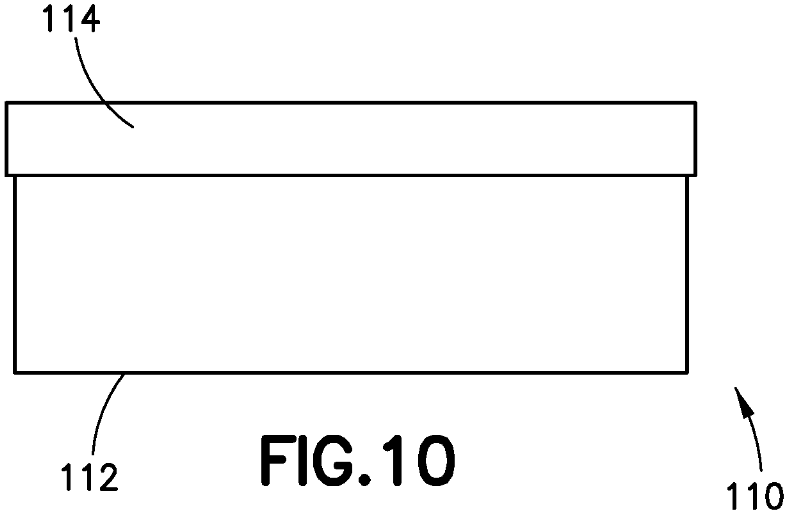
FIG. 10 is a side elevational view of the core assembly of FIG. 9.
Figure 11:
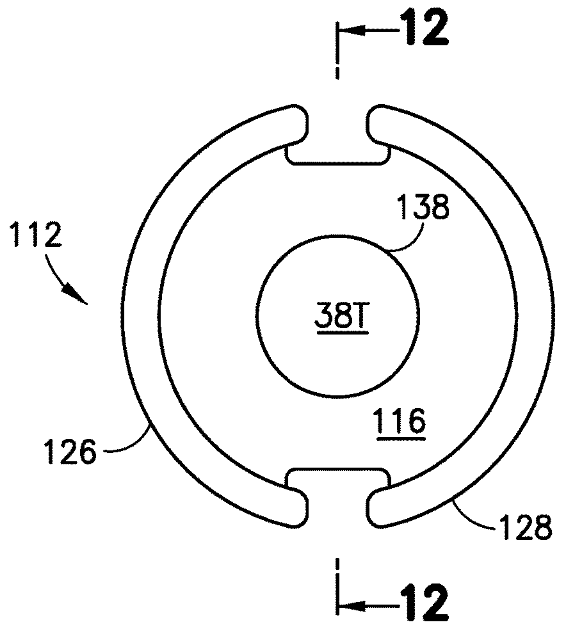
FIG. 11 is a top plan view of the base of the core assembly illustrated in FIGS. 9 and 10.
Figure 12:
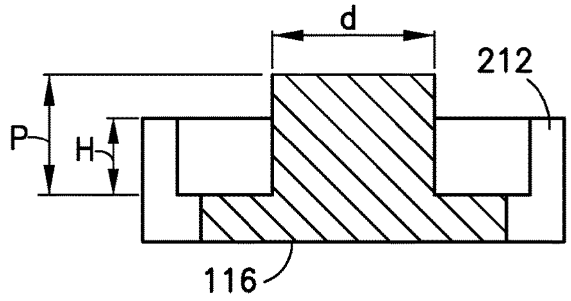
FIG. 12 is a side elevational view of the base taken along line 12-12 in FIG. 11.
Figure 13:
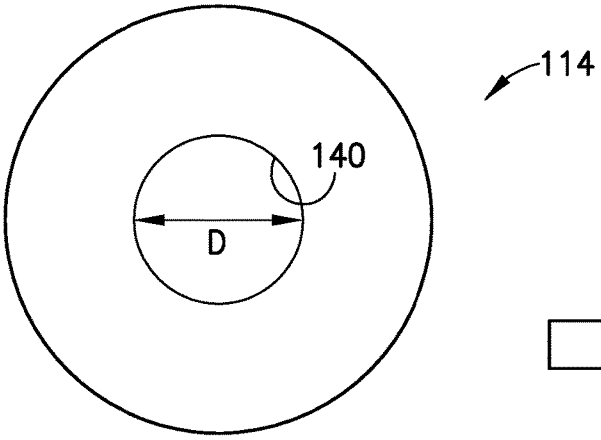
FIG. 13 is a top plan view of the lid of the core assembly illustrated in FIGS. 9 and 10.
Figure 14:
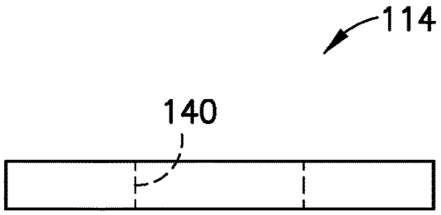
FIG. 14 is a side elevational view of the lid illustrated in FIG. 13.
Figure 15:
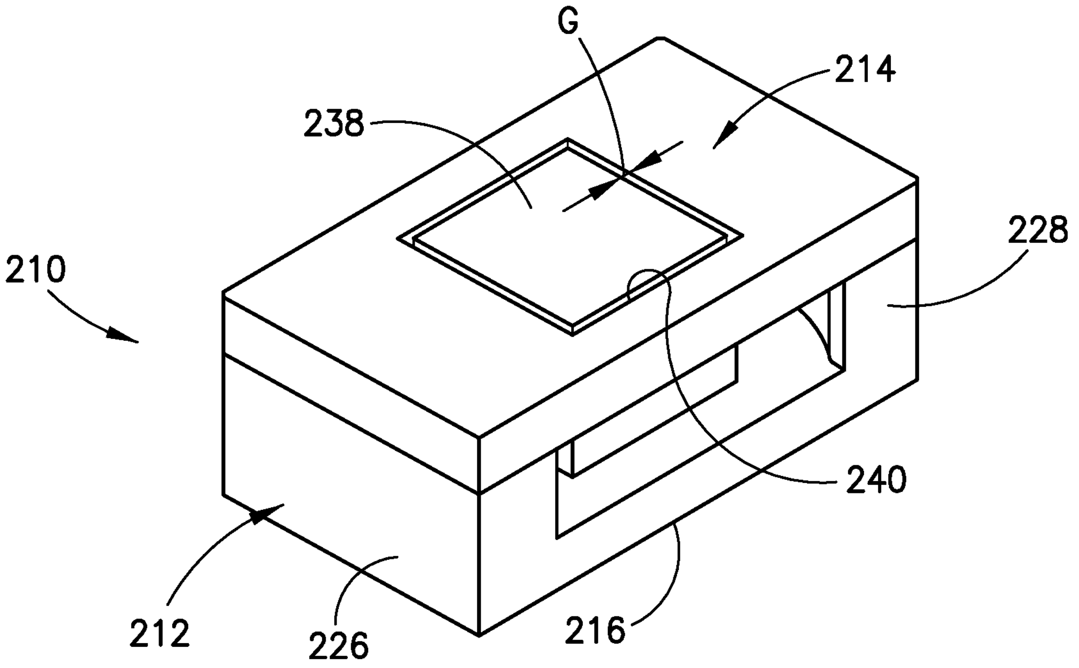
FIG. 15 is a perspective view of a core assembly comprised of a base and a lead in accordance with a third embodiment of the invention.
Figure 16:
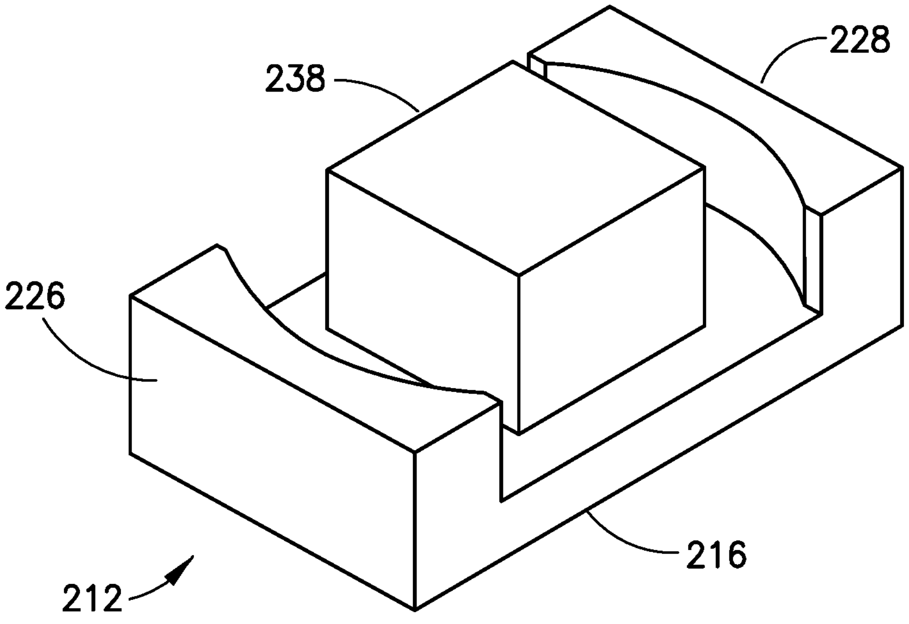
FIG. 16 is a perspective view of the base of the core assembly illustrated in FIG. 15.
Figure 17:
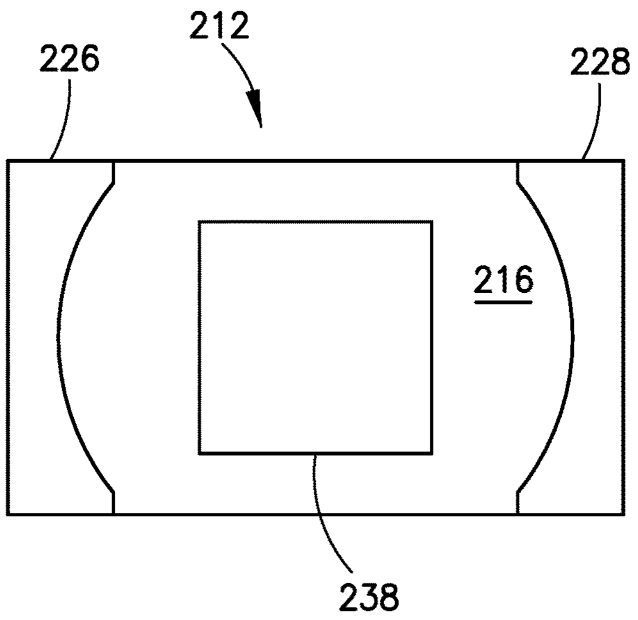
FIG. 17 is a top plan view of the base illustrated in FIG. 16.
Figure 18:
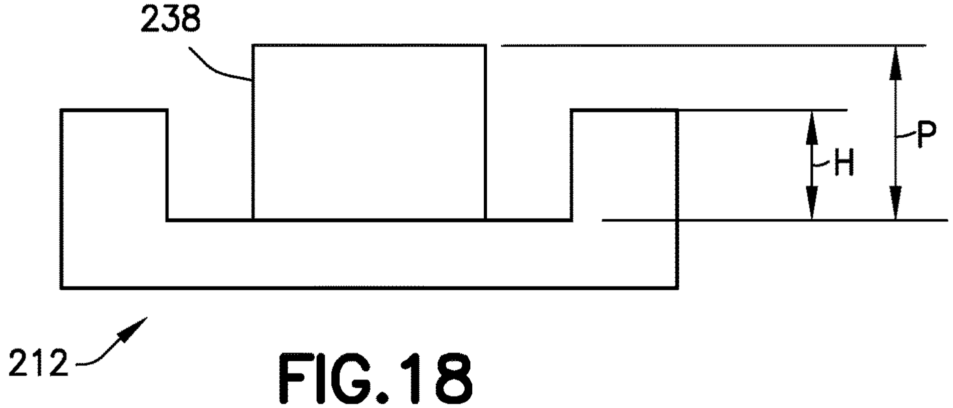
FIG. 18 is a side elevational view of the base illustrated in FIGS. 16 and 17.
Figure 19:
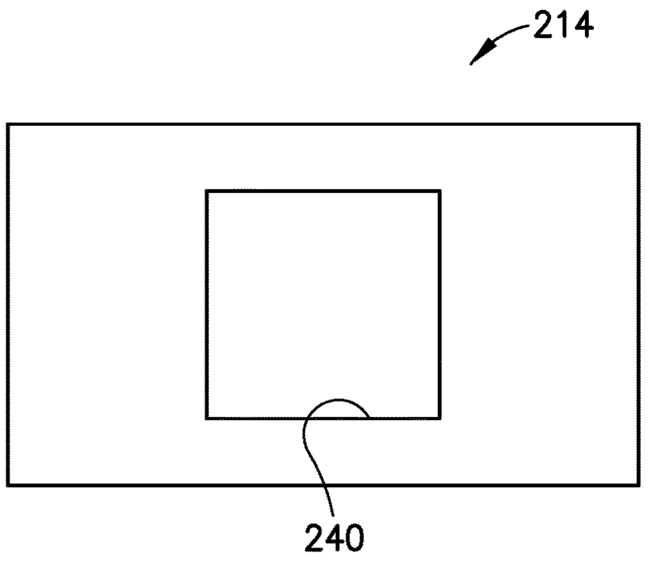
FIG. 19 is a top plan view of the lid of the core assembly shown in FIG. 16.

The core assembly 10 is assembled by winding a magnetic wire W around the center protrusion 38 of the base 12 so that opposite ends of the metal wire W project through one of the openings 34 or 36 between the end walls 26 and 28 and to positions beyond the side 18 or 20 of the base 12, as shown in FIG. 8. The lid 14 then is mounted on the base 12. More particularly, end regions of the lid 14 are supported on the top ends 30 and 32 of the end walls 26 and 28, and the center protrusion 38 projects into the circular opening 40 in the lid 14. In this mounted position of the illustrated embodiment, the top surface 38T of the center protrusion 38 is substantially flush with the top surface of the lid 14. Additionally, a gap G with a specified radial dimension is defined between the center protrusion 38 and the cylindrical peripheral surface of the opening 40 in the lid 14. The specific radial dimension of the gap G is selected to control the inductance factor $A_L$ of the core assembly 10.

A core assembly in accordance with a second embodiment is identified generally by the numeral 110 in FIGS. 9-14. The core assembly 110 includes a base 112 and a lid 114 that are functionally similar to the base 12 and the lid 14 of the first embodiment of the core assembly 10, as illustrated in FIGS. 1-8. However, the core assembly 110 differs from the first embodiment in that the base 112 has a circular bottom wall 116 and opposite end walls 126 and 128 that define segments of a right cylinder. A center protrusion 138 projects up from the bottom wall 116 at a position concentric with the end walls 126 and 128. As in the first embodiment, the center protrusion 138 projects up from the bottom wall 116 a projecting distance P that is greater than the heights H of the opposite end walls 126 and 128. Additionally, the center protrusion 138 of the core assembly 110 has a diameter d.

The lid 114 of the core assembly 110 is a planar circular disc with an outside diameter substantially equal to a diameter defined by the outer circumference defined by the circularly generated end walls 126 and 128 of the base 112. Additionally, the lid 114 has a circular opening 140 concentric with the circular outer periphery of the lid 114. The circular opening 140 has a diameter D that is greater than the diameter d of the center protrusion 138 by a specified gap distance G.

The core assembly 110 is used in a manner similar to the core assembly 10 of the first embodiment. In particular, a magnetic wire is wound around the center protrusion 138 of the base 112. Opposite ends of the magnetic wire project through one of the spaces between the circularly generated end walls 126 and 128. The lid 114 then is assembled onto the base 112 by inserting the center protrusion 138 of the base 110 through the circular opening 140 in the lid 114. In this assembled condition the lid 114 is supported on the upper ends of the circularly generated end walls 126 and 128 with the outer periphery of the lid 114 substantially registered with the cylindrically generated outer surfaces of the end walls 126 and 128. Additionally, the top surface of the center protrusion 138 is substantially flush with the top surface of the lid 114. A gap G of specified radial dimensions exists between the outer periphery of the center protrusion 138 and the inner circumferential surface of the opening 140 in the lid 114. As with the first embodiment, the specific radial dimension of the gap G is selected to control the inductance factor $A_L$ of the core 110.

The center protrusion of the core assembly need not be cylindrical and the opening in the lid need not be circular. Additionally, concentricity of the center protrusion and inner surfaces of the end walls is not essential. In this regard, a third embodiment of the core assembly is identified generally by the numeral 210 in FIGS. 15-19. The core assembly

210 has a base 212 and a lid 214. The base 212 has a rectangular bottom wall 216 and opposite end walls 226 and 228 with shapes that are similar to corresponding parts of the base 12 of the core assembly 10 of the first embodiment. However, the base 212 has a rectangular center protrusion 238 projecting up from the bottom wall 216 by a projecting distance P that exceeds the projecting height of each of the end walls 226 and 228. The lid 214 of the core assembly 210 is substantially rectangular in a manner similar to the lid 14 of the core assembly 10 of the first embodiment. However, unlike the lid 14 of the first embodiment, the lid 214 has a rectangular opening 240 with length and width dimensions slightly greater than corresponding dimensions of the rectangular center protrusion 238.

The lid 214 is assembled onto the base 212 so that outer end regions of the lid 214 are supported on upper ends of the end walls 226 and 228 of the base 212. Additionally, the rectangular center protrusion 238 of the base 212 projects sufficiently through the rectangular opening 240 in the lid 214 so that the upper end of the center protrusion 238 is substantially flush with the upper surface of the lid 214, with a gap G of specified dimension being defined between the rectangular center protrusion 238 and the inner periphery of the rectangular opening 240 in the lid 214. The core assembly 210 is used with a magnetic winding wire similar to the winding wire illustrated with respect to the first embodiment of FIG. 8.

While the invention has been described with respect to certain illustrative examples, it should be understood that various revisions can be made without departing from the scope of the invention as defined by the appended claims.

The invention claimed is:

1. A core assembly formed from a material having a magnetic permeability greater than 1, the core assembly comprising:

a base having a bottom wall, opposed end walls projecting up from the bottom wall and a center protrusion projecting up from the bottom wall at a position intermediate the end walls, a projecting distance of the center protrusion from the bottom wall being greater than a projecting height of the end walls from the bottom wall, the center protrusion having specified cross-sectional dimensions measured transverse to a projecting direction of the center protrusion from the bottom wall; and a lid mounted on upper ends of the end walls of the base, a center opening extending through the lid, cross-sectional dimensions of the center opening in the lid exceeding the specified cross-sectional dimensions of the center protrusion so that the center protrusion of the base is inserted into the center opening of the lid, the lid having a thickness so that an upper surface of the center protrusion is substantially flush with an upper surface of the lid when the lid is mounted on the upper ends of the end walls of the base.

2. The core assembly of claim 1, wherein the upper ends of the end walls of the base are substantially coplanar.

3. The core assembly of claim 1, wherein the center protrusion is substantially cylindrical and the center opening in the lid is substantially circular.

4. The core assembly of claim 1, wherein the center protrusion is substantially rectangular and the center opening in the lid has a substantially rectangular cross-section larger than the center protrusion.

5. The core assembly of claim 1, wherein the bottom wall of the base is substantially rectangular and the lid has a rectangular shape conforming to the rectangular bottom wall of the base.

6. The core assembly of claim 1, wherein the opposed end walls are spaced apart from one another.

7. The core assembly of claim 1, wherein the bottom wall of the base is circular and the lid is a circular disc conforming to the circular bottom wall of the base.

8. The core assembly of claim 7, wherein the end walls of the base are circularly generated.

* * * * *